UNITED STATES PATENT OFFICE.

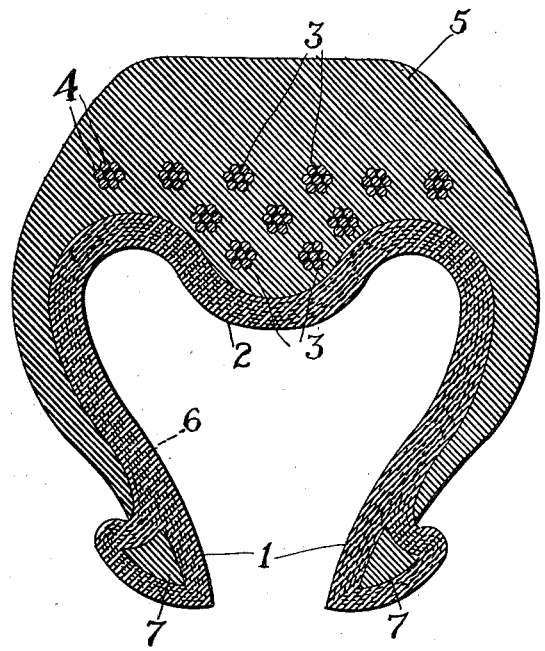

GRANT LAMBRIGHT, OF NEWARK, NEW JERSEY, ASSIGNOR OF ONE-HALF TO FRANK A. MAGOWAN, OF NEW YORK, N. Y.

PNEUMATIC VEHICLE-TIRE.

996,351.

Specification of Letters Patent. Patented June 27, 1911.

Application filed September 25, 1907. Serial No. 394,431.

*To all whom it may concern:*

Be it known that I, GRANT LAMBRIGHT, a citizen of the United States, residing in the city of Newark, in the county of Essex and State of New Jersey, have invented certain new and useful Improvements in Pneumatic Vehicle-Tires, of which the following is a specification.

This invention relates to pneumatic or inflated vehicle tires, and particularly to those of the detachable type.

My invention relates principally to the tread portion of the tire, and one main object is to overcome the tendency of the ordinary tire to expand or lengthen circumferentially of the rim, when inflated, whereby it becomes easier to rip off from the wheel; and I also aim to improve the durability and reliability of the tire, as well as to protect the same against puncture.

Instead of arching the plies of fabric at the tread, in the usual manner, these plies are depressed in a manner to form a deep groove longitudinally of the tire, so that in cross section the tubular structure formed by the plies of duck is roughly cordiform; the bore of the tire having approximately the same shape. The annular mold upon which the tire is built up, has a groove extending along its periphery, into which the rubber and fabric plies are depressed during the construction of the tire. In such depression I apply binding devices in the form of metal cables, preferably steel or iron, which will not only hold the plies of duck securely during the subsequent vulcanizing operation, but also serve, while the tire is in use, to prevent longitudinal extension of the tread portion of the tire. These binding wires are preferably built up alternately with layers of rubber, to make the tread of extraordinary thickness, and also practically unyielding in longitudinal direction. The flexible cables or wires, the rubber, and the fabric, taken together, form a hoop, which is so substantial as to be self-sustaining. The rubber of the tread is vulcanized to the metal cables, so as to become practically inseparable therefrom, thus conducing to strength and durability of the tire. When the tire is inflated, this outer hoop does not yield to air pressure because of the inextensibility of the cables, so that the tire does not enlarge circumferentially of the wheel, thus avoiding tendency to escape from the rim.

Said thickened tread or hoop forms an independent support for air pressure. That is to say, it is capable of withstanding, without elongation, a much greater air pressure than is usual in pneumatic tires, and this makes it practicable to employ air pressure to much better purpose than heretofore for compressing the rim side of the tire against the rim of the wheel. The base portion of the tire is thus placed between two substantial supports, one of said supports being the rim itself, and the other being the hoop-like thickened tread of the tire, and it is securely held by great pressure, said pressure being sustained on one side by said rim, and on the other side by said hoop. The greater the air pressure in the tire, the tighter will the tire hug the rim.

Another advantage flowing from the herein described construction of the tread, is found in the reduced liability of the side walls of the tire to disruption from the air pressure, since the tread or hoop portion, unsupported, is strong enough to take great air pressure without yielding longitudinally, and hence the side walls are substantially relieved of such pressure as is diametrical of the wheel, and which in ordinary tires is due to the necessity of the side walls sustaining substantially all of the air pressure to which the weak tread is subjected in radial direction.

The accompanying drawing shows a cross section of a tire cover made in accordance with my present improvements. This tire may be attached to the rim in the usual manner.

The walls of the tire-cover embody the usual layers of duck or the like, which form a tubular structure 1, extending along the rim of the wheel. This tubular structure of fabric is formed with a deep depression or inverted arch 2 extending around the wheel, so that the internal contour of the cover is substantially cordiform or two-lobed; the usual inner or air tube (not shown) having, of course, a corresponding shape and being inflated in the usual manner. The plies of duck may be pressed into a suitable mold to form the depression 2, and unvulcanized rubber may be placed within said depression, and cables 3 wound upon the rubber. Then more rubber may be packed in, and more cables wound thereon, and so on, the layers of rubber preferably alternating with the layers of cables, thereby filling up the groove or depression 2 in the cover. The final or top winding of the cables may extend across for practically the entire width of the tread, so that the tire for its entire width is protected against puncture. The cables should be made of metal, which is not affected by the attacks of pointed objects which would ordinarily penetrate through the tread and puncture the air tube.

Each cable preferably consists of numerous wires or strands 4, which are wound upon one another in the usual manner, thereby producing cables which are so flexible as not to reduce the resiliency of the tire to an objectionable extent. The rubber not only adheres effectively to the metal, but also enters the crannies between the wires of each cable, to interlock therewith, so that disruption of the tire is precluded.

If desired, the fabric and rubber portion 1 of the tread may be built up separately, and then the rubber tread portion 5, with its cables 3, may be made in a separate mold, and then the two parts may be brought together to form the complete structure shown in the drawing, and then the whole subjected to vulcanization.

It will be understood that the binding cables taken together contribute materially to the security of this portion of the tire against longitudinal extension, due to the air pressure within the tire; while the layers of rubber of the tread taken together with the binding cables and the plies of duck 6 in the portion 2 of the tire form a substantial hoop, in the nature of a rim, which is self-sustaining against air pressure, and is still sufficiently yielding to exterior pressure to insure an easy-riding, resilient tire. Said cables have the effect of binding together the plies of fabric in the depressed portion 2 of the cover, so that the plies are not liable to become separated in use, thereby tending materially to prolong the life of the tire. It will be seen that the plies of duck 6 are anchored by being carried around hard rubber rings 7 formed in the base portion of the cover.

Variations may be resorted to within the scope of the invention, and portions of the improvements may be used without others.

Having thus described my invention, I claim:

1. A pneumatic tire for vehicles comprising a cover having a single solid tread which is materially thickened integrally only along its middle portion so that the interior contour of the tread is cordiform in cross-section, a series of flexible inextensible metallic cables extending around the tread within said thickened portion; said cables separated one from another and embedded in the rubber of the tread and vulcanized thereto.

2. A pneumatic tire for vehicles, comprising a rim portion, a single solid tread portion, and flexible walls connecting said portions; the tread portion extending about the entire width of the tire, and only at its middle portion being greatly thickened in proportion to the width of the tire, so as to form a substantially self-sustaining annular rib integral with the tread; flexible inextensible metal cables being embedded in said rib and separated from each other to avoid unduly stiffening the tread, and forming inner windings and outer windings overlying the spaces between the inner windings, to protect the tire against puncture.

3. A pneumatic tire for vehicles, comprising a rim portion, a single solid tread portion, and flexible walls connecting said portions; the tread portion extending about the entire width of the tire, and only at its middle portion being greatly thickened in proportion to the width of the tire, so as to form a substantially self-sustaining annular rib integral with the tread; flexible inextensible metal cables being embedded in said rib and separated from each other to avoid unduly stiffening the tread, and forming inner windings and outer windings overlying the spaces between the inner windings, to protect the tire against puncture; the layer of outer windings for substantially the entire width of the tread.

4. A vehicle tire, comprising a tubular portion of fabric and rubber having an integral interior longitudinal rib only in the middle of its crown portion and a single solid rubber tread vulcanized to said tubular portion; hoops or coils of flexible inextensible cable extending or directed around said tubular portion within said tread, said hoops or coils separated from one another across the tire and certain of them lying within said depressed portion; said coils arranged in tiers or layers, each hoop in the coils in one tier overlying the spaces between the coils in another tier to protect the tire from puncturing; the coils in the outer tier overlying the outer portion of said tube beyond the sides of said rib.

GRANT LAMBRIGHT.

Witnesses:
 CHARLES J. KIERAN,
 JOHN B. KIERAN.